United States Patent
Yan et al.

(10) Patent No.: US 8,989,324 B2
(45) Date of Patent: Mar. 24, 2015

(54) RECEIVER AND RECEIVING METHOD

(71) Applicant: Fujitsu Limited, Kawasaki-shi, Kanagawa (JP)

(72) Inventors: Meng Yan, Beijing (CN); Zhenning Tao, Beijing (CN)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 14/052,070

(22) Filed: Oct. 11, 2013

(65) Prior Publication Data

US 2014/0037032 A1 Feb. 6, 2014

Related U.S. Application Data

(63) Continuation of application No. PCT/CN2011/072711, filed on Apr. 13, 2011.

(51) Int. Cl.
    *H04L 1/00* (2006.01)
    *H04L 25/03* (2006.01)
    *H04L 27/26* (2006.01)
    *H04J 11/00* (2006.01)

(52) U.S. Cl.
    CPC .......... *H04L 25/03* (2013.01); *H04L 25/03821* (2013.01); *H04L 27/2647* (2013.01); *H04J 11/0046* (2013.01)
    USPC ........... 375/348; 375/346; 375/316; 375/350; 375/354; 375/371

(58) Field of Classification Search
    USPC .................. 375/348, 346, 316, 350, 354, 371
    See application file for complete search history.

(56) References Cited

U.S. PATENT DOCUMENTS

| 8,290,033 | B2* | 10/2012 | Garg et al. ..................... 375/231 |
| 8,498,542 | B2* | 7/2013 | Frankel et al. ................ 398/184 |
| 2003/0152050 | A1* | 8/2003 | Mochizuki ..................... 370/332 |
| 2004/0264592 | A1* | 12/2004 | Sibecas et al. ................ 375/267 |
| 2007/0258600 | A1* | 11/2007 | Cleveland et al. .......... 381/71.11 |
| 2009/0059781 | A1 | 3/2009 | Tseng et al. |

(Continued)

FOREIGN PATENT DOCUMENTS

| CN | 1440135 A | 9/2003 |
| CN | 101378375 A | 3/2009 |

(Continued)

OTHER PUBLICATIONS

International Search Report mailed Jan. 19, 2012 in corresponding International Patent Application No. PCT/CN2011/072711.

(Continued)

*Primary Examiner* — Kenneth Lam
(74) *Attorney, Agent, or Firm* — Staas & Halsey LLP

(57) ABSTRACT

Embodiments of the present invention provide a receiver and a receiving method. The receiver comprises: a branch forming unit a plurality of signal branches; each of the signal branches comprising a joint processing unit; and the joint processing unit being used to eliminate an inter-carrier interference of the subcarrier signal in a present signal branch and the subcarrier signals in other signal branches adjacent to the present signal branch. With the embodiments of the present invention, the inter-carrier interference may be eliminated and the performance of the system may be improved; and the sampling rate of the analog digital converter may also be lowered.

12 Claims, 9 Drawing Sheets

(56) References Cited

U.S. PATENT DOCUMENTS

2011/0038435 A1* 2/2011 Omidi et al. .................. 375/260
2011/0274016 A1* 11/2011 Nentwig ........................ 370/281

FOREIGN PATENT DOCUMENTS

EP          1337085 A2   8/2003
WO         WO 98/59414   12/1998

OTHER PUBLICATIONS

Benyuan Zhu et al., "Ultra-Long-Haul Transmission of 1.2-Tb/s Multicarrier No-Guard-Interval CO-OFDM Superchannel Using Ultra-Large-Area Fiber" IEEE Photonics Technology Letters, vol. 22, No. 11, pp. 826-828, Jun. 1, 2010.

S.J. Savory et al., "Transmission of 42.8Gbit/s Polarization Multiplexed NRZ-QPSK over 6400km of Standard Fiber with no Optical Dispersion Compensation" Optical Fiber Communication and the National Fiber Optic Engineers Conference, 2007. OFC/NFOEC 2007. pp. 1-3.

S. Chandrasekhar et al., "Experimental investigation on the performance of closely spaced multi-carrier PDM-QPSK with digital coherent detection," Optics Express vol. 17, No. 24, pp. 21350-21361 (2009).

S. Chandrasekhar et al. "Terabit Superchannels for High Spectral Efficiency" European Conference and Exhibition on Optical Communication (ECOC), Sep. 2010, pp. 1-6.

Chinese Office Action issued Jul. 2, 2014 in corresponding Chinese Patent Application No. 201180069460.4.

Chinese Office Action issued Dec. 31, 2014 in corresponding Chinese Patent Application No. 201180069460.4.

* cited by examiner

RECEIVER AND RECEIVING METHOD

CROSS REFERENCE TO RELATED APPLICATIONS

This application is a continuation of and claims the benefit of International Application No. PCT/CN2011/072711, filed Apr. 13, 2011, the disclosures of all of which are incorporated herein by reference.

TECHNICAL FIELD

The present invention relates to the field of communication technology, and in particular to a coherent optical orthogonal frequency division multiplexing (OFDM) superchannel receiver and a receiving method.

BACKGROUND ART

In order to improve the capacity and spectrum usage rate of optical communications, coherent OFDM has attracted the interests of the researchers recently. An OFDM superchannel comprises a plurality of optical carriers, each of the optical carriers individually being modulated, forming several sub-channels, with these sub-channels jointly constituting a superchannel. Each of the optical carriers may use a high-level modulation format (such as QPSK).

In such a system, an interval between subcarriers equals to a baud rate, and severe overlapping exists in the spectrum of each of the sub-channels; however, due to the orthogonality between them, theoretically, each of the sub-channels can still be demodulated and does not interfere with each other. At a receiving side, after being frequency mixed with a local oscillator laser, an optical signal is converted into an electrical signal by an optoelectric detector, and after analog-digital conversion, the electrical signal is subjected to a series of digital signal processing (DSP). DSP comprises subcarrier separation, adaptive equalization, frequency offset compensation, phase recovery etc., and compensates for such effects as transmission damage, frequency offset, line width, etc., and finally recovers the transmitted data. The DSP technique used in a receiver is one of the key techniques of the superchannel. A method reported in an existing document is to use a plurality of local oscillator lasers to target at different subcarriers respectively, so as to receive the subcarriers, and individually perform DSP processing on each of the received subcarriers to demodulate the data.

FIG. 1 is a schematic diagram of the structure of a superchannel receiver of the prior art. As shown in FIG. 1, the receiver divides a signal into multiple paths by using a coupler after receiving the signal from a transmitter. As shown in FIG. 1, a signal branch corresponding to a path of signal may comprise a front end processing device 101 and a signal compensating device 102. Wherein, the front end processing device 101 may comprise a local oscillator (LO) laser 1011, a mixer (HB) 1012, an anti-aliasing filter (AAF) 1013, an analog digital converter (ADC) 1014, a captive dispersion compensator (CDC) 1015 and an adaptive equalizer (AEQ) 1016. And the signal compensating device 102 may comprise a frequency offset compensator (FOC) 1021, a carrier phase recoverer (CPR) 1022 and a data recoverer (DR) 1023.

As shown in FIG. 1, each path of signal may correspond to a local oscillator laser 1011. In a practical system, a plurality of local oscillator lasers may come from an independent laser, and may also come from a multicarrier light source (in non-patent document 1), or a mode-locked laser, etc. In general, it may be a certain laser source containing a plurality of discrete wavelengths.

As shown in FIG. 1, a superchannel optical signal is respectively mixed with local oscillator lasers with different wavelengths, and may be converted into a baseband electrical signal by an optoelectric detector in the mixer 1012. When only one subcarrier is demodulated in each time of sampling, a plurality of local oscillator light sources respectively target to frequencies of a plurality of subcarriers. And then the electrical signals are converted to a digital domain after being sampled by the anti-aliasing filter 1013 and the analog digital converter 1014, and are subsequently subjected to a series of digital signal processing.

Wherein, the captive dispersion compensator 1015 is configured to compensate for the accumulated dispersion after long-haul optical fiber transmission; the adaptive equalizer 1016 is configured to compensate for residual dispersion, polarization mode dispersion and other dynamic linear damages; the frequency offset compensator 1021 is configured to compensate for the frequency offsets of the lasers at the transmitting side and the receiving side; the carrier phase recoverer 1022 is configured to compensate for the phase noise of the lasers at the transmitting side and the receiving side; and the data recoverer 1023 is configured to recover the transmitted data. FIG. 1 shows the case where only one subcarrier is demodulated in each time of sampling, and multiple subcarriers may also be demodulated in each time of sampling.

FIG. 2 is another schematic diagram of the structure of a superchannel receiver of the prior art. As shown in FIG. 2, the front end processing device 201 further comprises a subcarrier separator (SCS) 2010, by which an input signal is separated into two carriers. However, it is not limited thereto, and the input signal may be separated into more carriers, and the numbers of the carriers separated by the subcarrier separators may be identical or different. The number of carriers separated by the subcarrier separator of each branch depend on the system design, and how many branches the whole superchannel is separated into for reception and how many carriers in each branch in which data are recovered should be specified in the system design.

In the implementation of the present invention, the inventors found that the cost of the code error rate can only be lowered to an acceptable level when the sampling rate is very high. As the baud rate of an optical sub-channel is relatively high (at a magnitude of 10 GHz), the sampling rate of an existing analog digital converter cannot satisfy such a requirement. Hence, simple use of methods in which sampling rate is increased is greatly restricted.

In the prior art, digital signal processing on subcarriers is performed independently. Such a method of independently processing subcarriers is at a certain cost of code error rate, and such independent processing cannot eliminate the interference between the subcarriers, and the performance of the system is hence affected.

Non-patent document 1: Benyuan Zhu et al, Ultra-long-haul transmission of 1.2 Tb/s multicarrier no-guard-interval CO-OFDM superchannel using ultra-large-area fiber, Photonics Technology Letters, vol. 22, no. 11, p. 826, 2010;

Non-patent document 2: S. Chandrasekhar et al, Terabit superchannels for high spectral efficiency transmission, ECOC 2010, Tu.3.C.5;

Non-patent document 3: S. Chandrasekhar et al, Experimental investigation on the performance of closely spaced multi-carrier PDM-QPSK with digital coherent detection, Optics Express, vol. 17, no. 24, p. 21350, 2009; and Non-patent document 4: S. J. Savory et al, Transmission of 42.8 Gb/s polarization multiplexed NRZ-QPSK over 6400 km of standard fiber with no optical dispersion compensation. OTuA1, OFC 2007.

SUMMARY OF THE INVENTION

Embodiments of the present invention provide a receiver and a receiving method, with an object being to eliminate the inter-carrier interference and improve the performance of the system.

According to an aspect of the present invention, there is provided a receiver, comprising:

a branch forming unit, configured to divide a signal from a transmitter into multiple branches of subcarrier signals; and a plurality of signal branches, each of the signal branches comprising a joint processing unit, the joint processing unit being used to eliminate an inter-carrier interference of the subcarrier signal in a present signal branch and the subcarrier signals in other signal branches adjacent to the present signal branch.

According to another aspect of the present invention, there is provided a receiving method, in which a signal from a transmitter is divided into multiple branches of subcarrier signals, for each signal branch, the method comprising:

eliminating an inter-carrier interference of the subcarrier signal in a present signal branch and the subcarrier signals in other signal branches adjacent to the present signal branch.

According to still another aspect of the present invention, there is provided a computer-readable program, wherein when the program is executed in a receiver, the program enables the computer to carry out the receiving method as described above in the receiver.

According to further still another aspect of the present invention, there is provided a storage medium in which a computer-readable program is stored, wherein the computer-readable program enables the computer to carry out the receiving method as described above in a receiver.

The advantage of the embodiments of the present invention exists in: an inter-carrier interference may be eliminated by the joint processing unit, by joint processing the subcarrier signal in the present signal branch and the subcarrier signals in other signal branches adjacent to the present signal branch. Therefore, the performance of the system is outstandingly improved; and if an appropriate anti-aliasing filter is used, the sampling rate of the analog digital converter may be lowered to a level of 2 times of the baud rate, which is far lower than that in the prior art, which is 4 times of the baud rate.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. To facilitate illustrating and describing some parts of the invention, corresponding portions of the drawings may be exaggerated or minified in size.

Elements and features depicted in one drawing or embodiment of the invention may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION OF THE INVENTION

Figure 1:
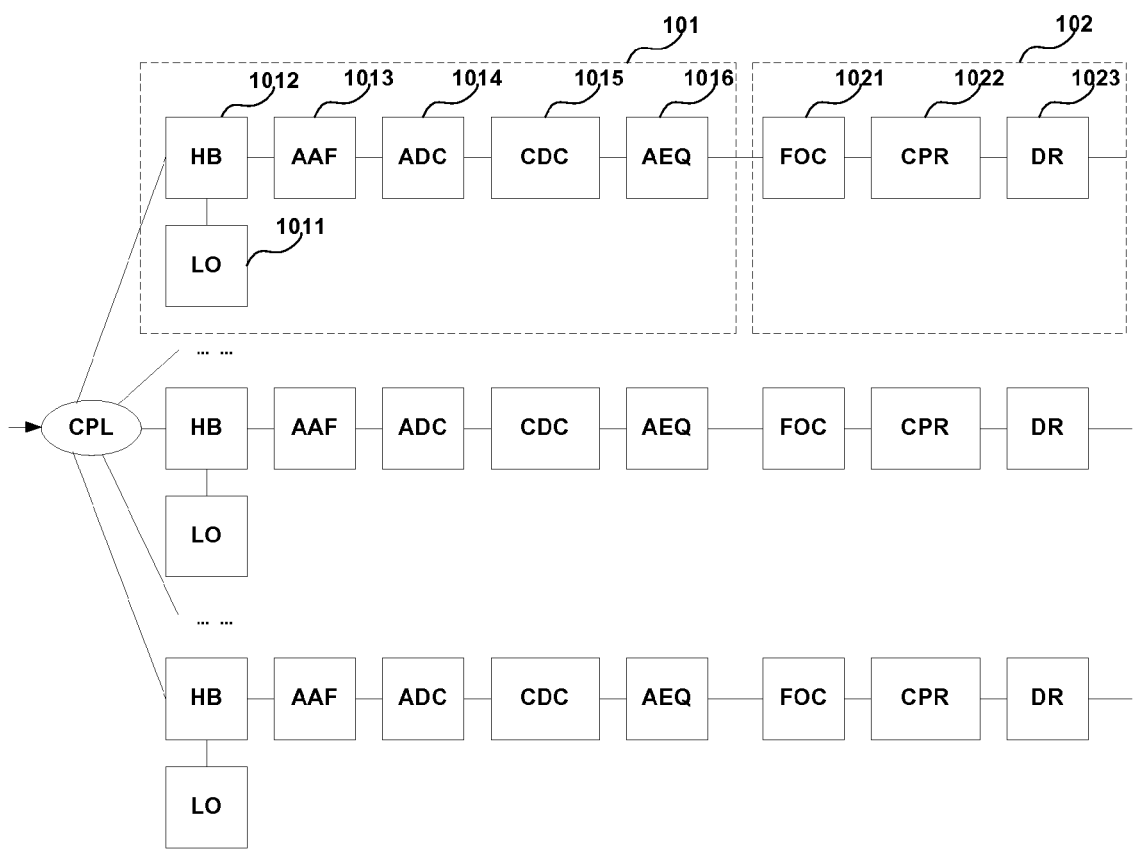
FIG. 1 is a schematic diagram of the structure of a superchannel receiver in the prior art.
Figure 2:
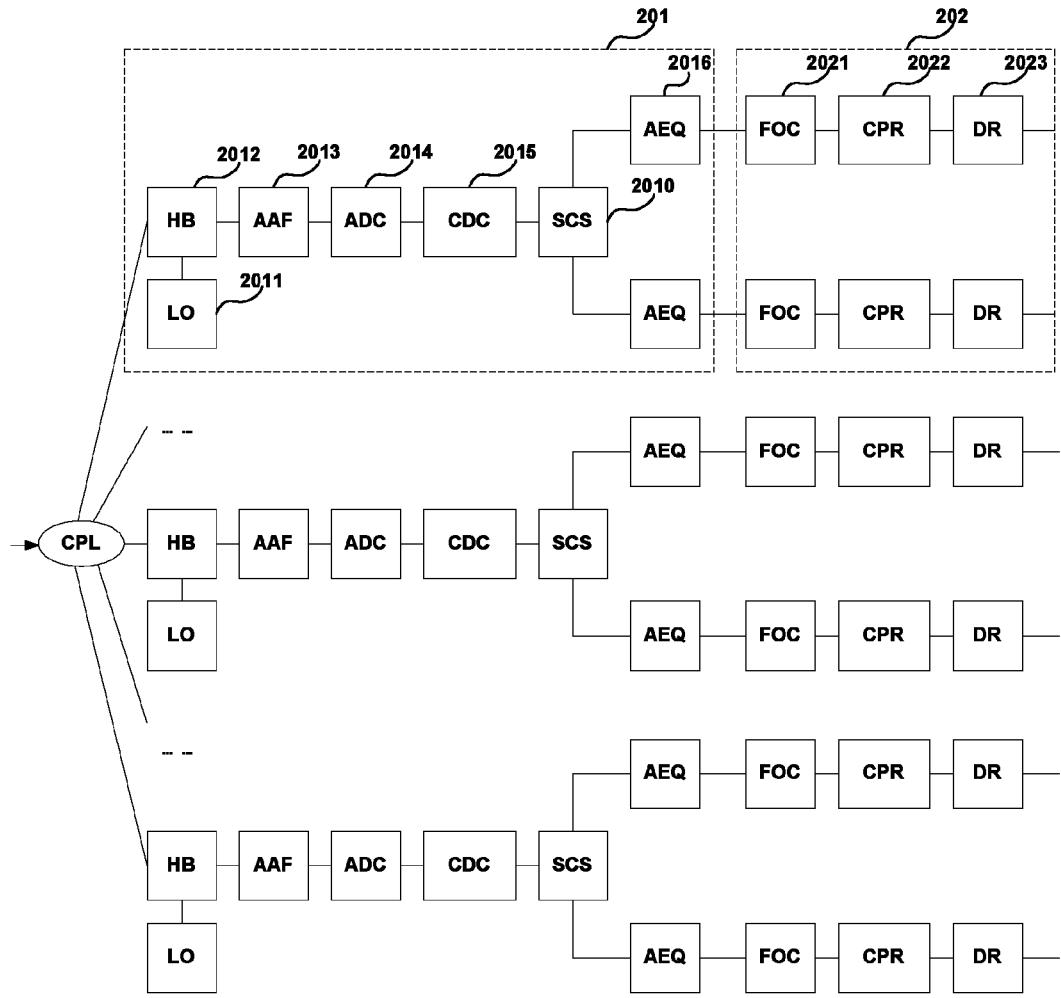
FIG. 2 is another schematic diagram of the structure of a superchannel receiver in the prior art.

The foregoing and other features of the embodiments of the present invention will become apparent with reference to the drawings and the following description. In the description and drawings, particular embodiments of the present invention are disclosed, which show some embodiments in which the principle of the present invention may be employed. It should be understood that the present invention is not limited to the described embodiments, on the contrary, the present invention includes all the modifications, variants and the equivalents thereof falling within the scope of the appending claims.

For easy understanding of the present invention, technologies related to the present invention are described in advance. Although such technologies are not described as the present invention itself and are described as the background for the understanding of the present invention, they should not be considered as being known.

It has been summarized by researchers that in demodulating a sub-channel from a plurality of sub-channels of an OFDM superchannel, the following four conditions need to be satisfied: (1) a subcarrier interval equals to a subcarrier baud rate; (2) symbols of the subcarriers are temporally synchronous; (3) a modulator of the transmitting side has a sufficient bandwidth; and (4) the receiving side has a sufficiently high sample rate and an appropriate anti-aliasing filter. According to the records of existing documents, a sampling rate of at least 4 times of the baud rate is needed in obtaining a better performance.

The signal of an OFDM superchannel may be expressed as:

$$\sum_{i=1}^{n} \sum_{m=-\infty}^{+\infty} a_{i,m} g(t-mT) e^{j\omega_i t};$$

where, j is an imaginary unit ($j^2=-1$), and g(t) is the waveform of a single symbol, a symbol in an OFDM superchannel having a square waveform in an ideal case, that is, $$g(t) = \begin{cases} 1 & 0 \le t < T \\ 0 & \text{otherwise} \end{cases};$$

where, T is a symbol cycle, $$\omega_i = i\Delta\omega = i\frac{2\pi}{T}$$

is an angular frequency of the i-th subcarrier, $a_{i,m}$ is the m-th symbol data of the i-th subcarrier, and n is the number of the subcarriers.

In an ideal case where there is no signal distortion, the receiving side uses a correlation reception in demodulating the k-th subcarrier, and the signal outputted by the receiver at a moment T is:

$$r_{k,0} = \frac{1}{T}\int_0^T \sum_{i=1}^{n} a_{i,0} e^{j(\omega_i - \omega_k)t} dt = \frac{1}{T}\int_0^T \sum_{i=1}^{n} a_{i,0} e^{j(i-k)\Delta\omega t} dt = a_{k,0};$$

where, $$\Delta\omega = \frac{2\pi}{T}$$

is an subcarrier interval. It can be seen therefrom that the orthogonality of $e^{j\omega_i t}$ makes that only the signal carried by the k-th subcarrier is demodulated without interference. Therefore, in such an ideal case where there is no signal distortion, there is no interference between the subcarriers of the OFDM superchannel.

In a practical OFDM superchannel, a filter of the transmitting side, a channel and a filter of the receiving side may be deemed as a whole, of which a transfer function being H(ω). When the sampling rate of the analog digital converter is sufficiently high, the spectrum of the whole superchannel is converted to a digital domain without aliasing, and the receiving side may eliminate the effect of H(ω) by using an equalizer, and then may demodulate data of any one of the subcarriers without interference by using the orthogonality.

In practice, the bandwidth occupied by a whole superchannel is very wide (a magnitude of 100GHz), and the sampling rate of the analog digital converter is far less than the bandwidth occupied by the whole superchannel. At this moment, the local oscillator laser of the receiving side can only be targeted at a certain subcarrier to demodulate the subcarrier, which may be referred to as a target subcarrier. Before the analog digital converter, an anti-aliasing filter needs to be used to restrict the spectrum of the signal within the range of the sampling rate of the analog digital converter, so as to avoid occurrence of spectrum aliasing after sampling.

In this way, the spectra in the superchannel within the range of the bandwidth of $R_s$ at the two sides of the frequency $f_{LO}$ of the local oscillator laser can only be maintained at one time of AD sampling, $R_s$ being the sampling rate of the analog digital converter. It has been reported in an existing document that an acceptable performance can only be obtained when $R_s$ is at least four times of the baud rate of the subcarrier; however, this is still far from the theoretical value. If the sampling rate $R_s$ is less than four times of the baud rate, the performance will be even worse. The main cause is that there exists an inter-carrier interference at this moment. Assuming that an ideal anti-aliasing filter is used:

$$H(f)_{AAF} = \begin{cases} 1 & f \in [f_{LO} - R_s/2, f_{LO} + R_s/2] \\ 0 & \text{otherwise} \end{cases} \quad (1)$$

When the receiver demodulates the i-th carrier by using a method of correlation reception, an output signal of a correlator may be written as:

$$r_i = (a_1 f_1 + \ldots + a_i f_i + \ldots + a_n f_n) \otimes s_i \quad (2)$$

where, $a_i$ is the symbol data in the i-th subcarrier, $s_i = e^{j\omega_i t}$ (0<t<T), $f_i$ being the signal of $s_i$ passing an ideal anti-aliasing filter with a transfer function of formula (1), and ⊗ denotes a correlation operation:

$$f_i \otimes s_j = \int_{-\infty}^{\infty} f_i(t) s_j^*(t) dt.$$

And the output of the correlator demodulating the subcarriers is:

$$\begin{bmatrix} r_1 \\ \vdots \\ r_i \\ \vdots \\ r_n \end{bmatrix} = \begin{bmatrix} b_{1,1} & b_{2,1} & \ldots & b_{n,1} \\ \vdots & & & \vdots \\ b_{1,i} & b_{2,i} & \ldots & b_{n,i} \\ \vdots & & & \vdots \\ b_{1,n} & b_{2,n} & \ldots & b_{n,n} \end{bmatrix} \begin{bmatrix} a_1 \\ \vdots \\ a_i \\ \vdots \\ a_n \end{bmatrix} \quad (3)$$

where, $b_{i,j} = f_i \otimes s_j$.

If the sampling rate is infinitely high, $f_i = s_i$, and it can be seen from the orthogonality of $s_i$ that B is a unit matrix, $r_i = a_i$, and there exists no inter-carriers interference; and if the sampling rate is limited, $f_i$ is the signal of $s_i$ passing the ideal anti-aliasing filter, and is no longer ideally orthogonal to $s_i$; therefore, B is no longer a unit matrix, and inter-carrier interference exists between $r_i$. Such inter-carrier interference cannot be eliminated by a conventional superchannel receiver, by individually processing the subcarriers.

An embodiment of the present invention provides a receiver, applicable to a coherent optical communication system. The receiver shall be described below in detail taking a coherent optical OFDM superchannel system as an example.

However, it should be noted that the embodiments of the present invention may be applicable to all the coherent optical communication systems where multiple channels exist, and are not limited to a coherent optical OFDM superchannel system only.

Figure 3:
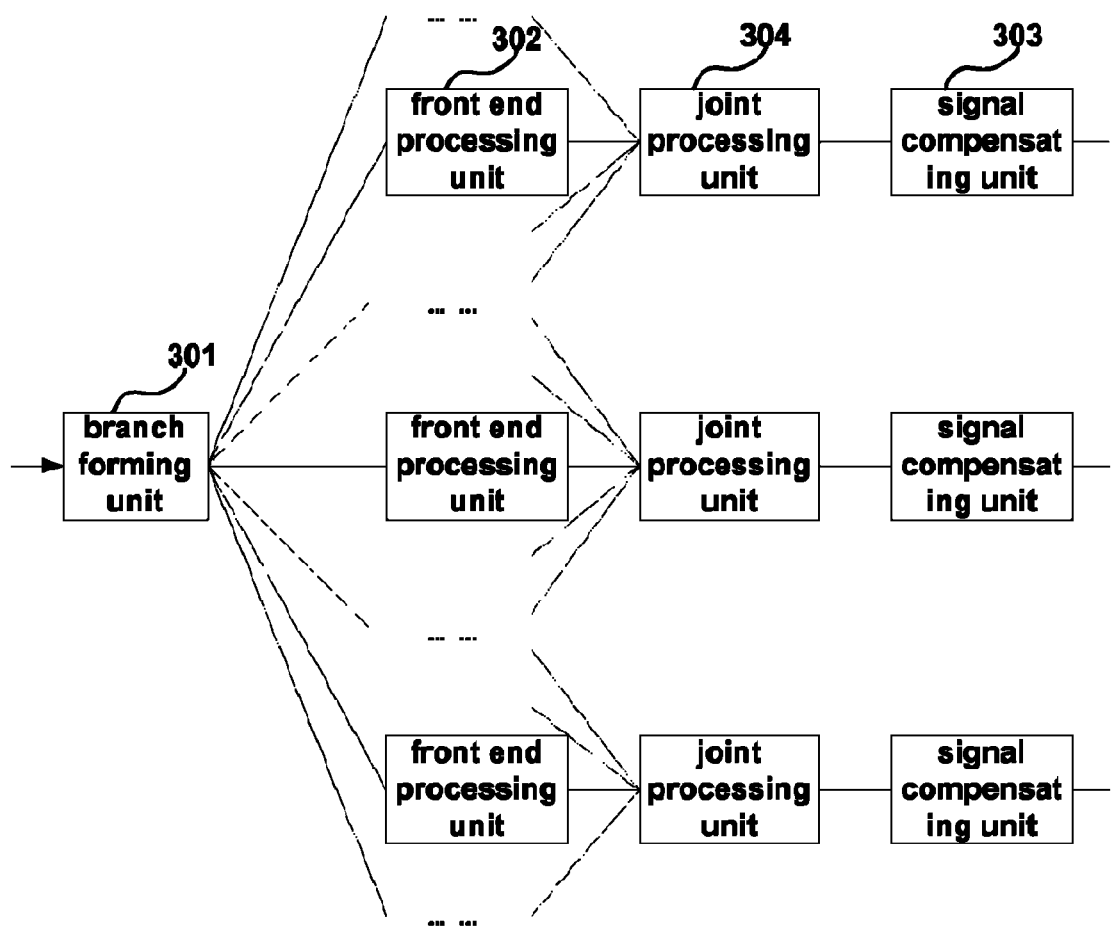
FIG. 3 is a schematic diagram of the composition of a receiver of an embodiment of the present invention.

FIG. 3 is a schematic diagram of the composition of a receiver of the embodiment of the present invention. As shown in FIG. 3, the receiver comprises: a branch forming unit 301 and a plurality of signal branches; wherein the branch forming unit 301 is configured to divide a signal from a transmitter into multiple branches of subcarrier signals, and each of the signal branches comprises a front end processing unit 302 and a signal compensating unit 303, which are as described in the prior art, and shall not be described herein any further.

As shown in FIG. 3, each of the signal branches further comprises a joint processing unit 304, arranged between the front end processing unit 302 and the signal compensating unit 303, and configured to eliminate an inter-carrier interference of the subcarrier signal in a present signal branch and the subcarrier signals in other signal branches adjacent to the present signal branch.

Figure 4:
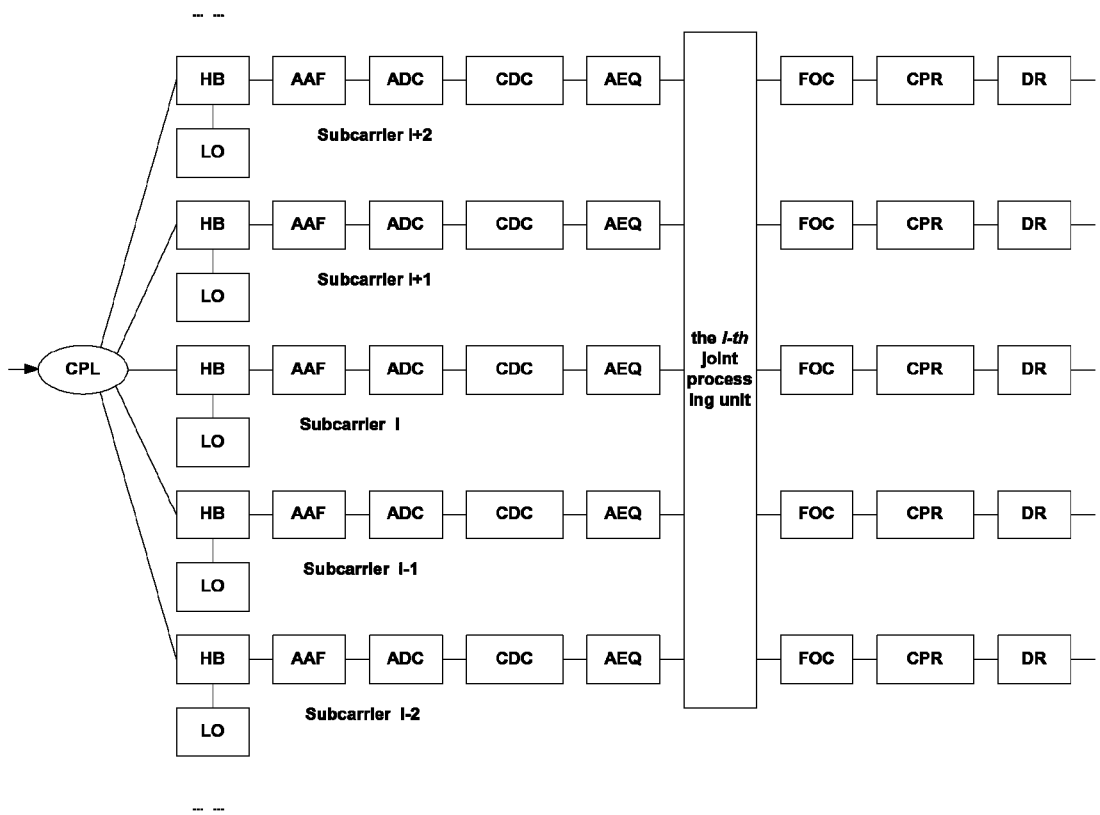
FIG. 4 is a schematic diagram of the composition of a part of a receiver of an embodiment of the present invention.

In an embodiment, as shown in FIG. 4, corresponding to the i-th subcarrier, the branch forming unit 301 may be a coupler; the front end processing unit 302 may comprise: a local oscillator laser, a mixer, an anti-aliasing filter, an analog digital converter, a captive dispersion compensator and an adaptive equalizer; and the signal compensating unit 303 may comprise: a frequency offset compensator, a carrier phase recoverer and a data recoverer. The joint processing unit 304 may be arranged between the adaptive equalizer and the frequency offset compensator.

Figure 5:
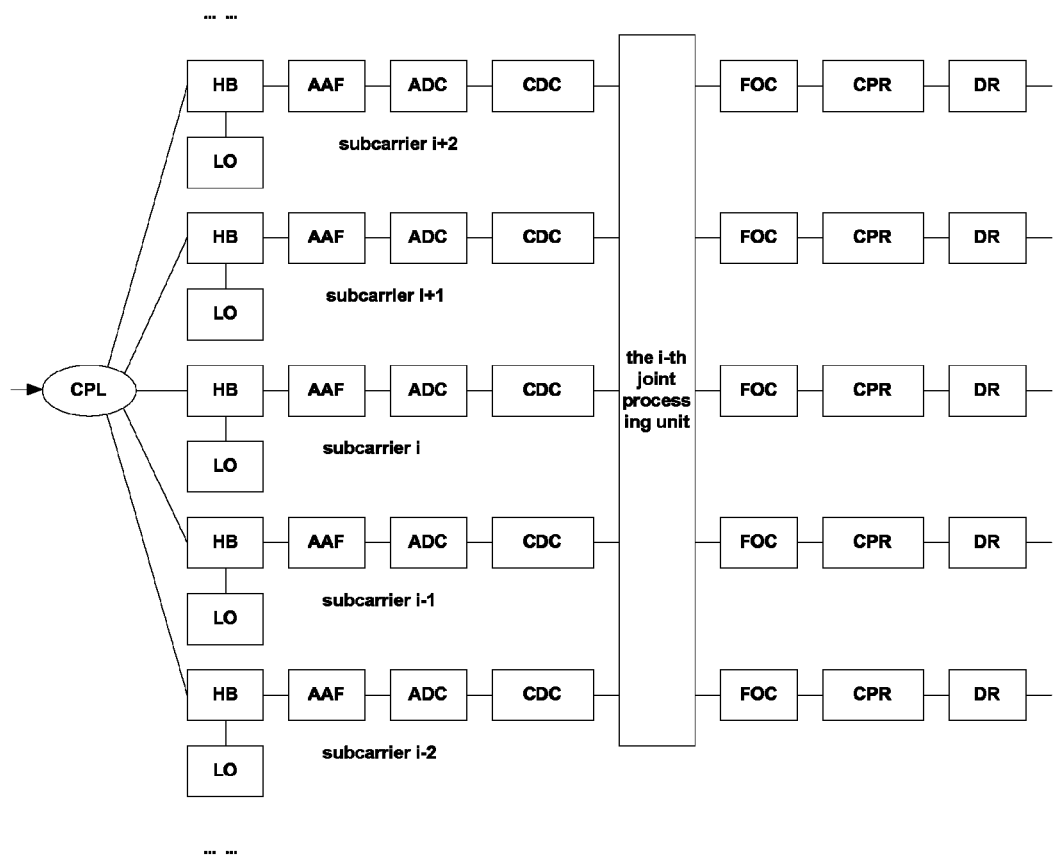
FIG. 5 is a schematic diagram of the composition of another part of a receiver of an embodiment of the present invention.

In another embodiment, as shown in FIG. 5, corresponding to the i-th subcarrier, the front end processing unit 302 may not comprise an adaptive equalizer, but incorporate an adaptive equalizer in the joint processing unit, the joint processing unit 304 being arranged between the captive dispersion compensator and the frequency offset compensator.

Figure 6:
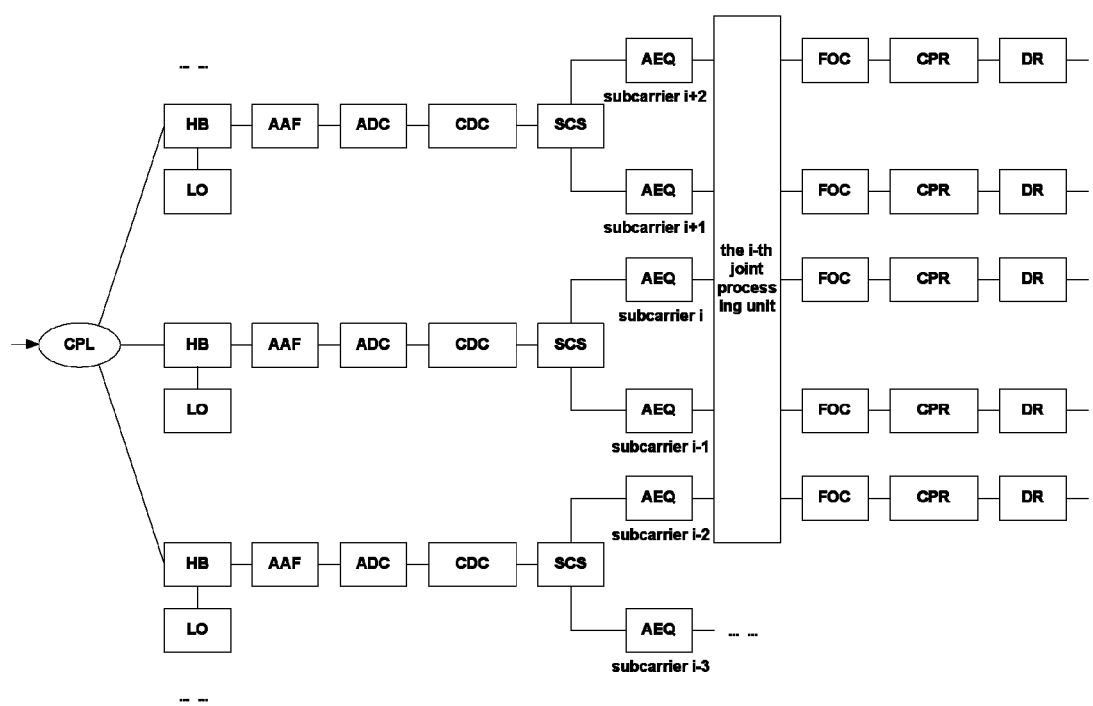
FIG. 6 is a schematic diagram of the composition of still another part of a receiver of an embodiment of the present invention.

In still another embodiment, as shown in FIG. 6, corresponding to the i-th subcarrier, the front end processing unit 302 may further comprise an adaptive equalizer and a carrier separator. And for each of the signal branches separated by the carrier separator, the joint processing unit 304 may be arranged between the adaptive equalizer and the frequency offset compensator.

Figure 7:
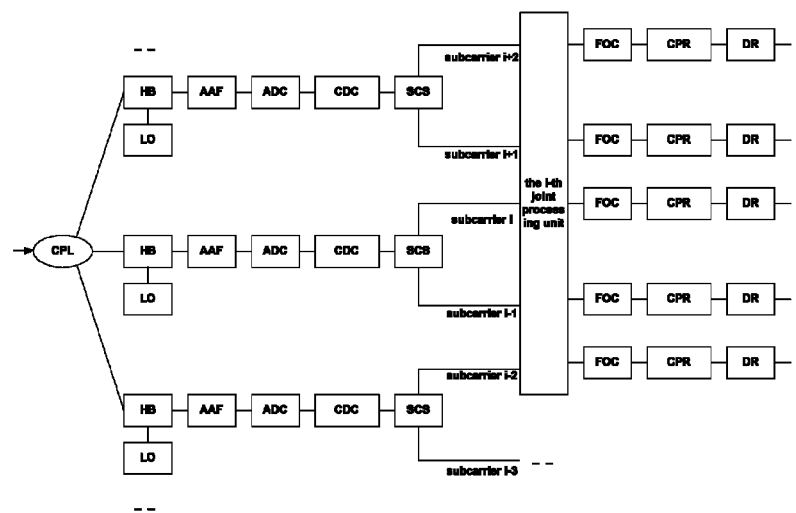
FIG. 7 is a schematic diagram of the composition of further still another part of a receiver of an embodiment of the present invention.

In further still another embodiment, as shown in FIG. 7, corresponding to the i-th subcarrier, the front end processing unit 302 may further comprise a carrier separator. For each of the signal branches separated by the carrier separator, the joint processing unit 304 may be arranged between the carrier separator and the frequency offset compensator.

The above illustrative description is given only for the position of arrangement of the joint processing unit. However, it is not limited thereto, and particular embodiments may be determined as actually required.

For the sake of simplicity, only the joint processing unit corresponding to the i-th subcarrier is illustrated in FIGS. 4-7; however, in practice, there are joint processing units corresponding to each of the subcarriers. The input of a joint processing unit corresponding to a certain subcarrier comprises not only a subcarrier signal of the present signal branch, but also several subcarrier signals around the subcarrier signal. For example, the input of the joint processing unit in FIG. 4 corresponding to the i-th subcarrier comprises an i-th subcarrier signal and subcarrier signals around it, totally five subcarrier signals, and the data of the i-th subcarrier may be recovered by jointly processing these signals.

It can be seen from above that in the receiver, for each signal branch, the inter-carrier interference may be eliminated by arranging a joint processing unit between the front end processing unit and the signal compensating unit. After the inter-carrier interference is eliminated, the performance of the system will be obviously improved; and if an appropriate anti-aliasing filter is used, the sampling rate of the analog digital converter may be lowered to two times of the baud rate, greatly lower than that in the prior art, which is four times of the baud rate.

In particular implementation, the joint processing unit 304 may perform weighted addition on the subcarrier signal in the signal branch and the subcarrier signals in other signal branches adjacent to the signal branch. The joint processing unit 304 may comprise a plurality of filters and an adder. Wherein the plurality of filters are configured to filter the subcarrier signal in the present signal branch and the subcarrier signals in other signal branches adjacent to the present signal branch, and the adder is configured to perform addition on the output results of the plurality of filters.

In an embodiment, the filters may be finite impulse response (FIR) filters, and the joint processing unit 304 may include a series of FIR filters and one or more adders. These FIR filters may be symbol interval FIR, that is, a sampling point is at each symbol; or may be fraction interval FIR, that is, a plurality of sampling points are at each symbol.

In particular implementation, as shown in FIG. 5, the joint processing unit may be arranged between the captive dispersion compensator and the frequency offset compensator, and the inputs of the FIR filters are the output results of the captive dispersion compensators; and as shown in FIG. 4 or 6, the joint processing unit may be arranged between the adaptive equalizer and the frequency offset compensator, and the inputs of the FIR filters are the output results of the adaptive equalizers.

In an embodiment, the subcarrier signal of each signal branch may be a single polarization signal, and the receiver may be a single polarization system; or the subcarrier signal may be a dual polarization signal, and the receiver may be a dual polarization system.

Figure 8:
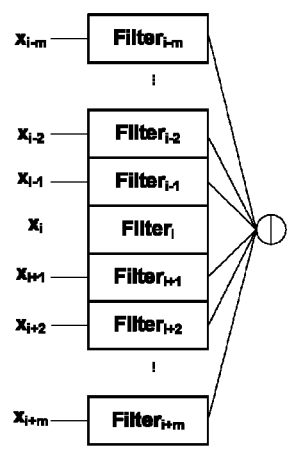
FIG. 8 is a schematic diagram of the composition of a joint processing unit used for single polarization of an embodiment of the present invention.

FIG. 8 is a schematic diagram of the composition of a joint processing unit used for single polarization of an embodiment of the present invention. As shown in FIG. 8, the joint processing unit of the i-th subcarrier signal jointly processes the i-th subcarrier signal, m neighboring subcarrier signals from the (i−m)-th subcarrier signal to the i-th subcarrier signal and m neighboring subcarrier signals from the i-th subcarrier signal to the (i+m)-th subcarrier signal, with total 2m+1 subcarrier signals being processed. Therefore, as shown in FIG. 8, the joint processing unit comprises 2m+1 filters and one adder.

Figure 9:
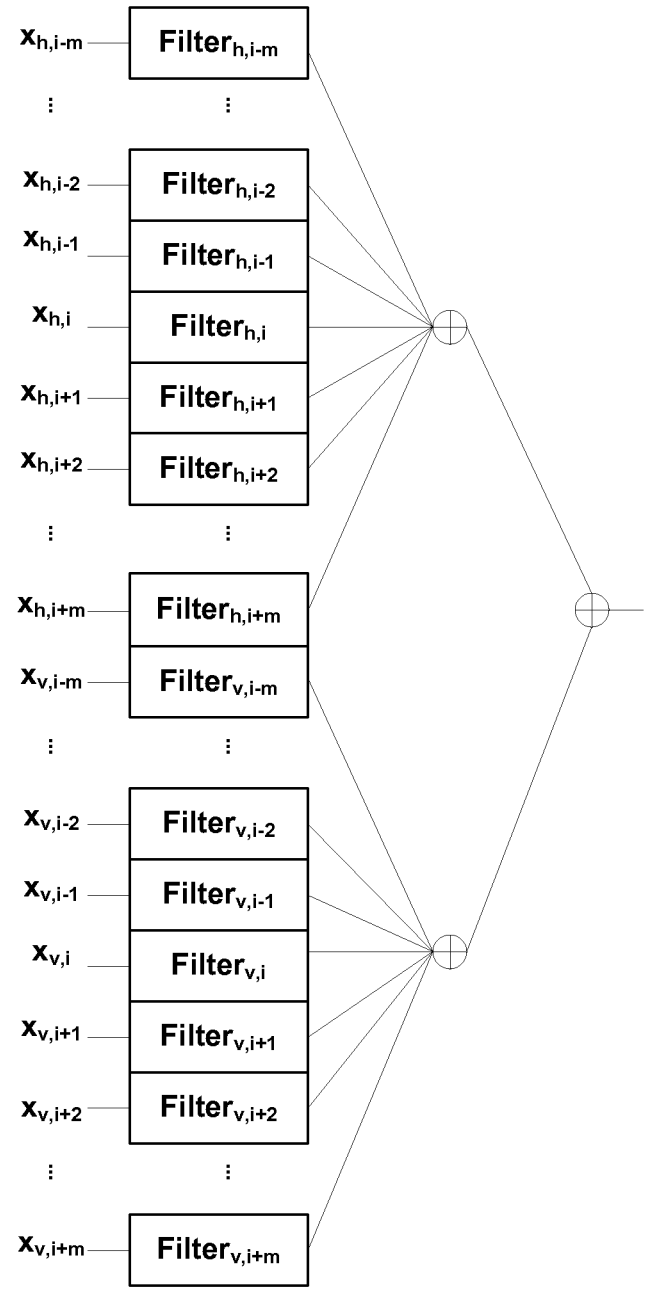
FIG. 9 is a schematic diagram of the composition of a joint processing unit used for dual polarization of an embodiment of the present invention.

FIG. 9 is a schematic diagram of the composition of a joint processing unit used for dual polarization of an embodiment of the present invention. As to shown in FIG. 9, the joint processing unit of the i-th subcarrier signal jointly processes the i-th subcarrier signal, m neighboring subcarrier signals from the (i−m)-th subcarrier signal to the i-th subcarrier signal and m neighboring subcarrier signals from the i-th subcarrier signal to the (i+m)-th subcarrier signal. In consideration of the h polarization direction and v polarization direction of each subcarrier signal, as shown in FIG. 9, the joint processing unit comprises 2×(2m+1) filters and three adders.

What described above is only schematic description of the composition of a joint processing unit. For example, in FIG. 8, for the i-th subcarrier signal, neighboring subcarrier signals symmetrical to each other up and down, that is, 2m+1 neighboring subcarrier signals from the (i−m)-th subcarrier signal to the (i+m)-th subcarrier signal, are jointly processed. However, it is not limited thereto; for example, m+1 subcarrier signals from the i-th subcarrier signal to the (i+m)-th subcarrier signal may be jointly processed; or edge asymmetrical subcarrier signals, such as m+n+1 subcarrier signals from the (i−n)-th subcarrier signal to the (i+m)-th subcarrier signal, may be jointly processed. The particular input signals and composition of a joint processing unit may be determined as actually required.

Taking a dual polarization system as an example, $x_{h,i,js}$ denotes the js-th sampling value of the i-th subcarrier signal in the h polarization direction, and $x_{v,i,js}$ denotes the js-th sampling value of the i-th subcarrier signal in the v polarization direction. It should be noted that the equalized signals are sampled s every symbol, s being a positive integer greater than or equal to 1. j is a serial number of a symbol.

A matrix $\dot{x}_{i,j}$ is extracted first, such a matrix being the input of the joint processing unit:

$$\dot{x}_{i,j} = \begin{bmatrix} x_{h,i-m,js-n} & \cdots & x_{h,i-m,js} & \cdots & x_{h,i-m,js+n} \\ \vdots & & \vdots & & \vdots \\ x_{h,i,js-n} & \cdots & x_{h,i,js} & \cdots & x_{h,i,js+n} \\ \vdots & & \vdots & & \vdots \\ x_{h,i+m,js-n} & \cdots & x_{h,i+m,js} & \cdots & x_{h,i+m,js+n} \\ x_{v,i-m,js-n} & \cdots & x_{v,i-m,js} & \cdots & x_{v,i-m,js+n} \\ \vdots & & \vdots & & \vdots \\ x_{v,i,js-n} & \cdots & x_{v,i,js} & \cdots & x_{v,i,js+n} \\ \vdots & & \vdots & & \vdots \\ x_{v,i+m,js-n} & \cdots & x_{v,i+m,js} & \cdots & x_{v,i+m,js+n} \end{bmatrix} \quad (4)$$

$$\dot{w}_{i,j} = \begin{bmatrix} w_{h,i-m,j-n} & \cdots & w_{h,i-m,j} & \cdots & w_{h,i-m,j+n} \\ \vdots & & \vdots & & \vdots \\ w_{h,i,j-n} & \cdots & w_{h,i,j} & \cdots & w_{h,i,j+n} \\ \vdots & & \vdots & & \vdots \\ w_{h,i+m,j-n} & \cdots & w_{h,i+m,j} & \cdots & w_{h,i+m,j+n} \\ w_{v,i-m,j-n} & \cdots & w_{v,i-m,j} & \cdots & w_{v,i-m,j+n} \\ \vdots & & \vdots & & \vdots \\ w_{v,i,j-n} & \cdots & w_{v,i,j} & \cdots & w_{v,i,j+n} \\ \vdots & & \vdots & & \vdots \\ w_{v,i+m,j-n} & \cdots & w_{v,i+m,j} & \cdots & x_{v,i+m,j+n} \end{bmatrix}$$

The matrix $\dot{x}_{i,j}$ is a matrix including 2n+1 sampling values taking the js-th sampling value as the center in 2m+1 subcarriers in the two polarization directions taking the i-th subcarrier as the center, with a number of matrix elements being L=2(2m+1)(2n+1). In this way, the inter-carrier interference may be eliminated by performing weighted addition on the elements in this matrix by using an appropriate weighting coefficient, and the data to which $x_{h,i,js}$ and $x_{v,i,js}$ correspond may be recovered. As shown in formula (4), the weighting coefficient may also be written as a corresponding matrix $\dot{w}_{i,j}$.

In this embodiment, each of the FIR filters in FIG. 8 or 9 may process multiple consecutive sampling values of a subcarrier signal; for example, if the tap number of the FIR filter is 2n+1, it performs weighted addition on every received consecutive 2n+1 sampling values and takes the result as the FIR output. Therefore, multiple sampling values may be accumulated, and joint processing may be performed by using multiple sampling values, thereby further improving the performance of the system.

As shown in formula (4), a filtering coefficient of each of the FIR filters has 2n+1 values, corresponding to a row in the coefficient matrix $\dot{w}_{i,j}$. In the structure shown in FIG. 4 or 6, the input of each of the FIR filters may be an equalized subcarrier signal, corresponding to a row in the coefficient matrix $\dot{w}_{i,j}$; or in the structure shown in FIG. 5 or 7, the input of each of the FIR filters may be a subcarrier signal before being equalized, corresponding to a row in the coefficient matrix $\dot{w}_{i,j}$.

In an embodiment, mapping f from a matrix to a vector may be defined, the mapping outputting one by one the elements in the matrix in row as a column of vectors:

$$A = \begin{bmatrix} a_{1,1} & a_{1,2} & \cdots & a_{1,n} \\ a_{2,1} & a_{2,2} & \cdots & a_{2,n} \\ \vdots & & \ddots & \vdots \\ a_{m,1} & a_{m,2} & \cdots & a_{m,n} \end{bmatrix}$$

$$f(A) = (a_{1,1} \; a_{1,2} \; \cdots \; a_{1,n} \; a_{2,1} \; a_{2,2} \; \cdots \; a_{2,n} \; a_{m,1} \; a_{m,2} \; \cdots \; a_{m,n})^T;$$

Let $x_{i,j}=f(\dot{x}_{i,j})$, and $w_{i,j}=f(\dot{w}_{i,j})$, the output of the joint processing unit is:

$$y_{h,i,j}=x_{i,j}^T w_{h,i,j}$$

$$y_{v,i,j}=x_{i,j}^T w_{v,i,j} \quad (5)$$

where, the two filtering coefficients $w_{h,i,j}$ and $w_{v,i,j}$ of two groups of FIR filters are respectively used to recover the signals in h polarization direction and v polarization direction.

In an embodiment, each of the signal branches may further comprise a coefficient updating unit configured to update the filtering coefficient of the filter according to the subcarrier signal being eliminated the inter-carrier interference.

In this embodiment, the filtering coefficients of the FIR filter may be obtained by using a method of decision-directed least mean square (DDLMS), which is used for decision-aided. However, it is not limited thereto, and other methods of coefficient updating may be employed as actually required. Following description is given in detail for the coefficient updating unit taking the DDLMS method as an example.

In this embodiment, the DDLMS method updates gradually the filtering coefficients according to a result of decision, and adaptively finds out the optimal coefficient. Following is the details: respectively performing frequency offset compensation and phase estimation on the subcarrier signal, so as to obtain phase estimation values $\hat{\phi}_{h,i,j}$ and $\hat{\phi}_{v,i,j}$ in two polarization directions, the phase estimation values containing an estimation value of a phase induced by the frequency offset and an estimation value of a phase induced by the phase noise, and the two phase estimation values being given by the frequency offset compensator and the phase recoverer. The phase-recovered signals are:

$$\tilde{y}_{h,i,j}=y_{h,i,j}e^{-j\hat{\phi}_{h,i,j}}$$

$$\tilde{y}_{v,i,j}=y_{v,i,j}e^{-j\hat{\phi}_{v,i,j}};$$

And the decisions made on them are $\hat{d}_{h,i,j}$ and $\hat{d}_{v,i,j}$. The function of the decision is to decide a signal as a value in a symbol set. In order to minimize mean square errors of a signal before decision and a decision value:

$$e_{h,i,j}=|y_{h,i,j}e^{-j\hat{\phi}_{h,i,j}}-\hat{d}_{h,i,j}|^2$$

$$e_{v,i,j} = |y_{v,i,j} e^{-j\phi_{v,i,j}} - \hat{d}_{v,i,j}|^2.$$

And the coefficients may be updated by using a gradient descent method:

$$w_{h,i,j+1} = w_{h,i,j} - \mu(y_{h,i,j} - \hat{d}_{h,i,j} e^{j\phi_{h,i,j}}) x^*_{i,j} \quad (5)$$

$$w_{v,i,j+1} = w_{v,i,j} - \mu(y_{v,i,j} - \hat{d}_{v,i,j} e^{j\phi_{v,i,j}}) x^*_{i,j} \quad (6)$$

where, a coefficient updating step $\mu$ is a real number greater than zero, and * denotes a conjugation. The above formula shall be converged after multiple times of iterating from an initial value. At this moment, the vectors $w_{h,i,j}$ and $w_{v,i,j}$ of L dimensions are closest to the optimal value, the inter-carrier interference may be eliminated by using formula (5), and $\hat{d}_{h,i,j}$ and $\hat{d}_{v,i,j}$ are the outputs of the receiver.

Figure 10:
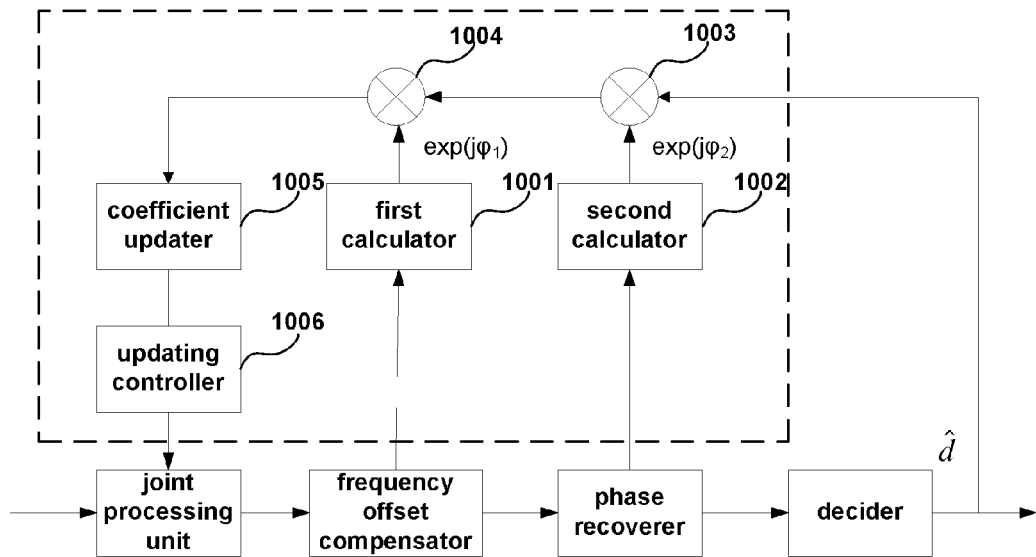
FIG. 10 is a schematic diagram of the composition of a coefficient updating unit of an embodiment of the present invention.

FIG. 10 is a schematic diagram of the composition of a coefficient updating unit of an embodiment of the present invention, in which only the coefficient updating unit for one signal branch is shown, and every signal branch may have a corresponding coefficient updating unit. It should be noted that the joint processing unit, the frequency offset compensator, the phase recoverer and a decider may be possessed in every signal branch, the joint processing unit may be as described above, the frequency offset compensator, the phase recoverer and the decider may be those in the prior art, which shall not be described any further.

As shown in FIG. 10, the coefficient updating unit may comprise a first calculator 1001, a second calculator 1002, a first multiplier 1003, a second multiplier 1004 and a coefficient updater; wherein, the first calculator 1001 is configured to calculate the phase estimation value induced by the frequency offset of the subcarrier signal in the signal branch, that is, to calculate exp(j$\phi$1), $\phi$1 being an output result of a frequency offset compensator in a corresponding branch, and j denoting a complex imaginary part; particularly, the frequency offset is one between the transmitting side laser to which the subcarrier corresponds and the local oscillator laser to which the signal branch corresponds;

the second calculator 1002 is configured to calculate the phase estimation value induced by the phase noise of the subcarrier signal in the signal branch, that is, to calculate exp(j$\phi$2), $\phi$2 being a output result of a phase recoverer in a corresponding branch, and j denoting a complex imaginary part; particularly, the phase noise is phase noises of the transmitting side laser to which the subcarrier corresponds and of the local oscillator laser to which the signal branch corresponds; and the first multiplier 1003 is configured to multiply the output result of the decider by the output result of the second calculator 1002; the second multiplier 1004 is configured to multiply the output result of the first multiplier 1003 by the output result of the first calculator 1001; and the coefficient updater 1005 is configured to update the filtering coefficient according to the output result of the second multiplier 1004.

In an embodiment, the coefficient updating unit further comprises an updating controller 1006 configured to control whether the coefficient updater 1005 updates the filtering coefficient of the filter. Therefore, with the updating controller 1006, whether the coefficients are updated may be controlled as actually required; for example, updating the coefficients every symbol or at an interval of several symbols. In particular implementation, the updating controller 1006 may be a switch. However, it is not limited thereto, and particular implementation may be determined as actually required.

Above description is given in detail for the case of dual polarization. For a case of single polarization, h and v sub-scripts are no longer distinguished, and the above formulae (4), (5) and (6) may be respectively as follows:

$$\hat{x}_{i,j} = \begin{bmatrix} x_{i-m,j s-n} & \cdots & x_{i-m,j s} & \cdots & x_{i-m,j s+n} \\ \vdots & & \vdots & & \vdots \\ x_{i,j s-n} & \cdots & x_{i,j s} & \cdots & x_{i,j s+n} \\ \vdots & & \vdots & & \vdots \\ x_{i+m,j s-n} & \cdots & x_{i+m,j s} & \cdots & x_{i+m,j s+n} \end{bmatrix} \quad (7)$$

$$\hat{w}_{i,j} = \begin{bmatrix} w_{i-m,j-n} & \cdots & w_{i-m,j} & \cdots & w_{i-m,j+n} \\ \vdots & & \vdots & & \vdots \\ w_{i,j-n} & \cdots & w_{i,j} & \cdots & w_{i,j+n} \\ \vdots & & \vdots & & \vdots \\ w_{i+m,j-n} & \cdots & w_{i+m,j} & \cdots & w_{i+m,j+n} \end{bmatrix}$$

$$y_{i,j} = x_{i,j}^T w_{i,j} \quad (8)$$

$$w_{i,j+1} = w_{i,j} - \mu(y_{i,j} - \hat{d}_{i,j} e^{j\phi_{i,j}}) x^*_{i,j} \quad (9)$$

The particular manners are similar to those in the case of dual polarization as described above, which shall not be described herein any further.

Figure 11:
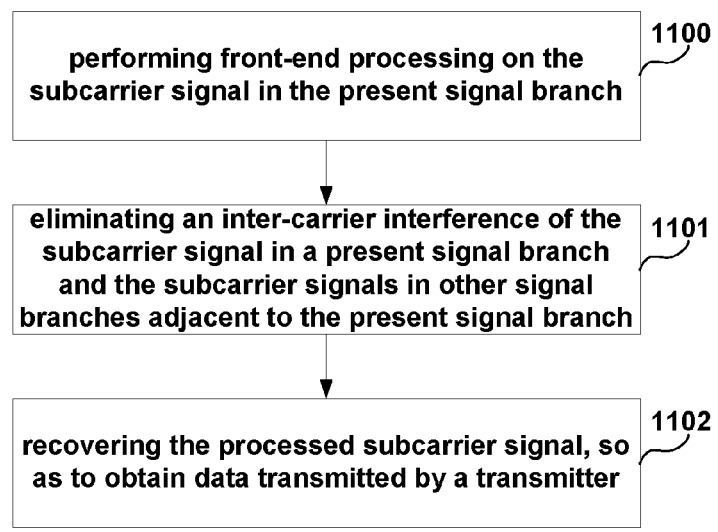
FIG. 11 is flowchart of a receiving method of an embodiment of the present invention.

An embodiment of the present invention further provides a receiving method, in which a signal from a transmitter is divided into multiple branches of subcarrier signals; for each signal branch, as shown in FIG. 11, the method comprises:

step 1101: eliminating an inter-carrier interference of the subcarrier signal in a present signal branch and the subcarrier signals in other signal branches adjacent to the present signal branch.

In this embodiment, all the subcarrier signal in the present signal branch and the subcarrier signals in other signal branches adjacent to the present signal branch in step 1101 are performed front-end processing. Hence, before to step 1101, the method may further comprise:

step 1100: performing front-end processing on the subcarrier signal in the present signal branch.

And after step 1101, the method may further comprise:

step 1102: recovering the processed subcarrier signal, so as to obtain data transmitted by a transmitter. Steps 1100 and 1102 are as described in the prior art, which shall not be described herein any further.

In this embodiment, in carrying out step 1101, a joint processing unit may be used to perform weighted addition on the subcarrier signal in the present signal branch and the subcarrier signals in other signal branches adjacent to the present signal branch.

In particular, step 1101 may comprise: filtering by a plurality of filters the subcarrier signal in the present signal branch and the subcarrier signals in other signal branches adjacent to the present signal branch; and adding up the output results of the plurality of filters.

Furthermore, each of the filters may process a plurality of consecutive sampling values of the subcarrier signal.

Furthermore, a filtering coefficient of each of the filters may be updated according to the subcarrier signal being eliminated the inter-carrier interference.

Furthermore, the updating the filtering coefficient of the filter comprises:

calculating by a first calculator a phase estimation value induced by a frequency offset of the subcarrier signal;

calculating by a second calculator a phase estimation value induced by a phase noise of the subcarrier signal;

multiplying by a first multiplier the estimation result of the subcarrier signal by an output result of the second calculator;

multiplying by a second multiplier the output result of the first multiplier by an output result of the first calculator; and updating the filtering coefficient according to an output result of the second multiplier.

Furthermore, the method further comprises controlling whether to update the filtering coefficient of the filter.

In particular implementation, the subcarrier signal in each of the signal branches may be a single-polarization signal, or a dual-polarization signal.

It can be seen from the above embodiment that the inter-carrier interference may be eliminated by a joint processing unit, by jointly processing the subcarrier signal in the present signal branch and the subcarrier signals in other signal branches adjacent to the present signal branch. Therefore, the performance of the system will be obviously improved; and if an appropriate anti-aliasing filter is used, the sampling rate of the analog digital converter may be lowered to two times of the baud rate, greatly lower than that in the prior art, which is four times of the baud rate.

An embodiment of the present invention further provides a computer-readable program, wherein when the program is executed in a receiver, the program enables the computer to carry out the method of receiving as described above in the receiver.

An embodiment of the present invention further provides a storage medium in which a computer-readable program is stored, wherein the computer-readable program enables the computer to carry out the method of receiving as described above in a receiver.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

The invention claimed is:

1. A receiver, comprising:
a coupler, configured to divide a signal from a transmitter into multiple branches of subcarrier signals; and
a plurality of signal branches, each of the signal branches comprising a joint processing unit, the joint processing unit being used to eliminate an inter-carrier interference of the subcarrier signal in a present signal branch and the subcarrier signals in other signal branches adjacent to the present signal branch;
wherein the joint processing unit comprises:
a plurality of filters, each of the filters being used to filter the subcarrier signal in the present signal branch and the subcarrier signals in other signal branches adjacent to the present signal branch according to a filtering coefficient; and
an adder, configured to add up the output results of the plurality of filters.

2. The receiver according to claim 1, wherein each of the filters processes a plurality of consecutive sampling values of a subcarrier signal.

3. The receiver according to claim 1, wherein the signal branch further comprises:
a coefficient updating unit, configured to update the filtering coefficient of each of the filters of the joint processing unit based on the subcarrier signal being eliminated the inter-carrier interference.

4. The receiver according to claim 3, wherein the coefficient updating unit comprises:
a first calculator, configured to calculate a phase estimation value induced by a frequency offset of the subcarrier signal;
a second calculator, configured to calculate a phase estimation value induced by a phase noise of the subcarrier signal;
a first multiplier, configured to multiply a decision result of the subcarrier signal by an output result of the second calculator;
a second multiplier, configured to multiply an output result of the first multiplier by an output result of the first calculator; and
a coefficient updater, configured to update the filtering coefficient according to an output result of the second multiplier.

5. The receiver according to claim 3, wherein the coefficient updating unit further comprises:
an updating controller, configured to control whether the coefficient updating unit updates the filtering coefficient of the filter.

6. The receiver according to claim 1, wherein the subcarrier signal in each of the signal branches is a single-polarization signal, or a dual-polarization signal.

7. A receiving method, in which a signal from a transmitter is divided into multiple branches of subcarrier signals, for each signal branch, the receiving method comprising:
eliminating an inter-carrier interference of the subcarrier signal in a present signal branch and the subcarrier signals in other signal branches adjacent to the present signal branch;
wherein the eliminating an inter-carrier interference of the subcarrier signal in a present signal branch and the subcarrier signals in other signal branches adjacent to the present signal branch comprises:
filtering, by a plurality of filters, the subcarrier signal in the present signal branch and the subcarrier signals in other signal branches adjacent to the present signal branch; and
adding up the output results of the plurality of filters.

8. The receiving method according to claim 7, wherein each of the filters processes a plurality of consecutive sampling values of a subcarrier signal.

9. The receiving method according to claim 7, wherein the method further comprises:
updating the filtering coefficient of each of the filters based on the subcarrier signal being eliminated the inter-carrier interference.

10. The receiving method according to claim 9, wherein the updating the filtering coefficient of the filter comprises:
calculating, by a first calculator, a phase estimation value induced by a frequency offset of the subcarrier signal;
calculating, by a second calculator, a phase estimation value induced by a phase noise of the subcarrier signal;
multiplying, by a first multiplier, an estimation result of the subcarrier signal by an output result of the second calculator;

multiplying, by a second multiplier, an output result of the first multiplier by an output result of the first calculator; and updating the filtering coefficient according to the output result of the second multiplier.

11. The receiving method according to claim 9, wherein the method further comprises:

controlling whether to update the filtering coefficient of the filter.

12. The receiving method according to claim 7, wherein the subcarrier signal in each of the signal branches is a single-polarization signal, or a dual-polarization signal.

* * * * *